Jan. 7, 1969 W. W. CHRISTENSEN 3,420,567
COLLAPSIBLE DWELLING UNIT
Filed March 20, 1967 Sheet 1 of 2
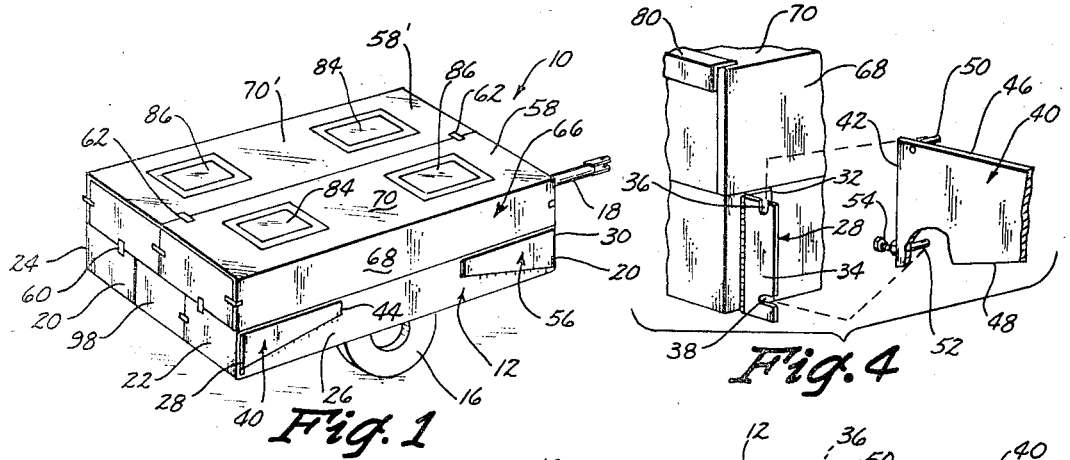
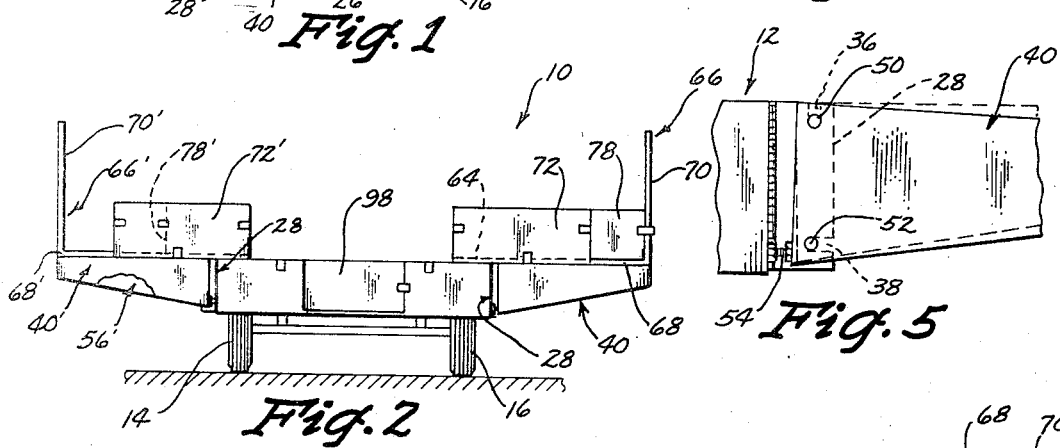
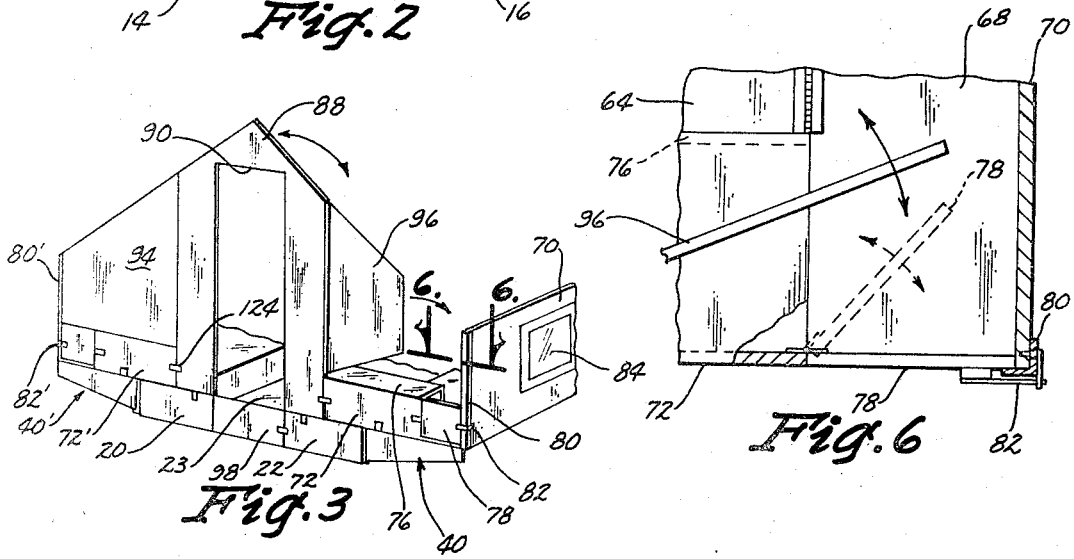
INVENTOR
WESTON W. CHRISTENSEN
BY
Zarley, McKee & Thomte
ATTORNEYS

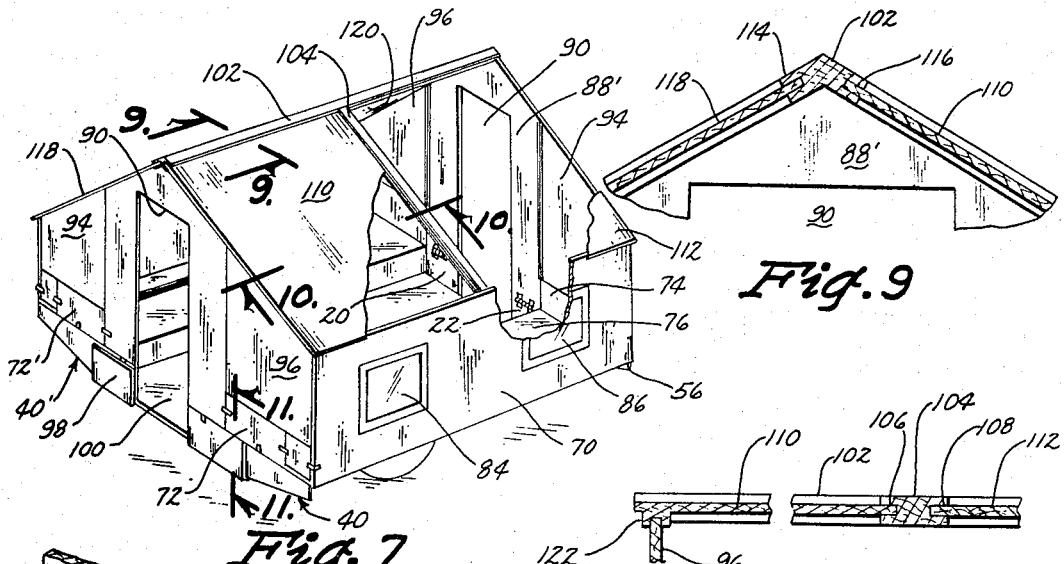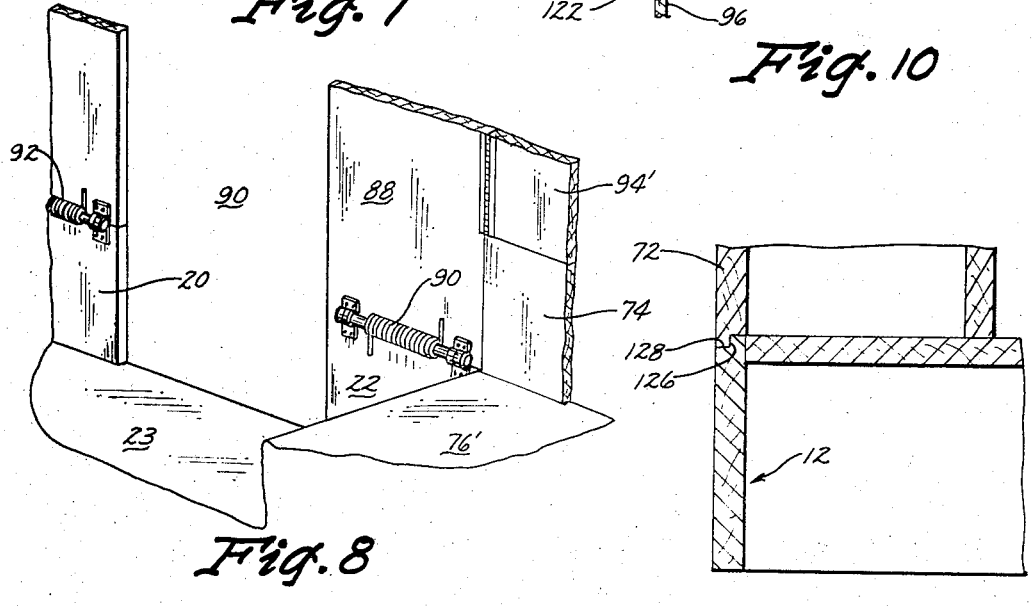

United States Patent Office 3,420,567
Patented Jan. 7, 1969

3,420,567
COLLAPSIBLE DWELLING UNIT
Weston W. Christensen, Lohrville, Iowa 51453
Filed Mar. 20, 1967, Ser. No. 624,289
U.S. Cl. 296—27             12 Claims
Int. Cl. B60p 3/34; E04b 1/344

ABSTRACT OF THE DISCLOSURE

A collapsible dwelling unit comprising, a rectangular base box having brace extensions movably secured to the corners thereof, a pair of box members selectively slidable on the top of the base box, each of the box members having an L-shaped cover member covering the top and outer side thereof and being adapted to be pivoted so that the outer side rests on the brace extensions and said top extends vertically upwardly therefrom, end members pivotally secured to the ends of the base box and adapted to pivot from a horizontal position in said base box to a vertical position on the ends of said base box, wing members on the sides of said end members which are adapted to pivot outwardly to join at their outer ends the vertical sides of the cover member on the box members and a roof means detachably supported by said end members and said wings.

---

It is a principal object of this invention to provide a collapsible dwelling unit which may be of the trailer type or which is suited for use on a truck body or the like.

A further object of this invention is to provide a collapsible dwelling unit which is easily and quickly assembled.

A further object of this invention is to provide a collapsible dwelling unit which is stable.

A further object of this invention is to provide a collapsible dwelling unit which is extremely compact when in a transport position but which is expandable to a large dwelling unit.

A further object of this invention is to provide a collapsible dwelling unit which is completely weatherized.

A further object of this invention is to provide a collapsible dwelling unit which is comprised of a plurality of rigid members pivotally interconnected in such a manner to provide a large dewlling unit when assembled and also providing an extremely compact unit when collapsed.

A further object of this invention is to provide a collapsible dwelling unit which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the unit in a collapsed condition;

FIG. 2 is a rear view of the unit when in a partly assembled condition;

FIG. 3 is a fragmentary rear perspective view of the unit in a partly assembled condition;

FIG. 4 is a fragmentary exploded perspective view illustrating the manner in which one of the brace supports is secured to the base box;

FIG. 5 is a fragmentary side view illustrating the pivotal adjustment of a brace support with respect to its associated hinge;

FIG. 6 is a sectional view as seen on line 6—6 and which illustrates the pivotal movement of the flap which is pivotally connected to the box member and also illustrating the pivotal movement of the wing member which is pivotally secured to an end member;

FIG. 7 is a rear perspective view of the unit in an assembled condition with portions thereof cut away to more fully illustrate the invention;

FIG. 8 is a fragmentary perspective view illustrating the construction of one of the end members;

FIG. 9 is an enlarged sectional view as would be seen on line 9—9 of FIG. 7;

FIG. 10 is an enlarged sectional view as would be seen on line 10—10 of FIG. 7; and FIG. 11 is an enlarged sectional view as would be seen on line 11—11 of FIG. 7.

The collapsible dwelling unit of this invention is indicated by the reference numeral 10 and is shown to be of the trailer type although the unit is suitable for use on a truck body or the like.

The numeral 12 designates a base box which is supported by a pair of ground engaging wheels 14 and 16 and has a hitch 18 extending forwardly therefrom. For purposes of description, box 12 will be described as having a forward end wall 20, rearward end wall 22, bottom 23 and opposite side walls 24 and 26. A pair of hinges 28 and 30 are secured to side 26 adjacent the rearward and forward ends thereof respectively. Likewise, a pair of hinges 28' and 30' (not shown) are secured to side 24 at the rearward and forward ends thereof respectively and are identical to hinges 28 and 30. Inasmuch as all of the hinges 28, 28', 30 and 30' are identical, only hinge 28 will be described in detail. Hinge 28 includes a hinge leaf 32 which is secured to side 26 by any convenient means such as bolts or the like and has a hinge leaf 34 hingedly secured thereto. Leaf 34 is provided with a notch 36 in its upper end and a notch 38 in its lower outer edge. The numeral 40 designates a brace support which is detachably adjustably secured to hinge 28. Brace support 40 includes an inner end 42, outer end 44, top 46 and bottom 48. A pin 50 is secured to brace support 40 and extends laterally thereof adjacent its upper rearward end and is adapted to be received by notch 36. A pin 52 is secured to brace support 40 and extends laterally thereof adjacent its lower rearward end and is adapted to be received by notch 38 as seen in FIG. 5. An adjusting bolt means 54 is secured to brace support 40 at the lower rearward end thereof and is adapted to be threadably moved with respect thereto to permit the selective pivotal positioning of brace support 40 about pin 50 with respect to box 12 as illustrated in FIG. 5. The head portion of bolt means 54 engages side 26 to selectively limit the downward pivotal movement of brace support 40 with respect to box 12. Brace support 40 may be pivoted from a position parallel to side 26 as seen in FIG. 1 to an outwardly extending position as seen in FIG. 2.

A brace support 40' is similarly secured to hinge 28' and will not be described in detail. Likewise, brace supports 56 and 56' are similarly secured to hinges 30 and 30' respectively and will not be described in detail since they are identical to brace support 40.

Box members 58 and 58' are secured to the top of base box 12 by a plurality of latch means 60 extending therebetween. Also a plurality of latch means 62 are secured to and extend between box members 58 and 58'. Inasmuch as box members 58 and 58' are identical, only box member 58 will be described with the suffix "'" indicating identical structure on box member 58'.

Box member 58 includes a bottom 64 and an L-shaped cover element 66 pivotally secured to the outer side edge thereof which is adapted to be pivoted with respect thereto from the "closed" position of FIG. 1 to the "open" position of FIG. 2. Box member 58 is slidably mounted on base box 12 and is movable from a position co-extensive with box member 58' (FIG. 1) to a second position (FIG. 2) when brace supports 40 and 56 have been pivoted to an outwardly extending position. In the position of FIG. 2, bottom 64 rests on base box 12 and brace supports 40 and 56 while side 68 of cover element 66 engages brace supports 40 and 56 while top 70 of cover element 66 extends vertically upwardly therefrom. Box member 58 is provided with a rear wall member 72 and a forward wall member 74 which extend vertically upwardly from the rearward and forward ends of bottom 64 as seen in FIG. 7. A storage compartment 76 is integral with rear wall 72 and a flap element 78 is pivotally secured to the outer side edge of wall 72 so that it may be pivoted from a position within storage compartment 76 to an outwardly extending position parallel to rear wall 72 as illustrated in FIG. 6.

An angle 80 is secured to the rearward edge of top 70 of cover element 66 as illustrated in FIG. 6 and is adapted to limit the outward pivotal movement of flap 78. A latch means 82 is secured to angle 80 and is adapted to be detachably secured to flap 78 as indicated in FIG. 6. As seen in the drawings, top 70 of cover element 66 is provided with a pair of windows 84 and 86.

An end member 88 having a door opening 90 formed therein is pivotally secured to the upper end of rearward wall member 22 and has a spring means 90 and a spring means 92 operatively secured to the hinge means which is adapted to yieldably maintain end member 88 in a vertical position. End member 88 is provided with a pair of wing members 94 and 96 pivotally secured to the opposite sides thereof which are adapted to be pivoted from a folded position adjacent end member 88 to an outwardly extending position with repsect thereto as seen in FIG. 7. As seen in FIGS. 3 and 7, wing members 94 and 96 terminate at a point immediately above the upper end of rear wall 72 and rear wall 72' of box members 58 and 58' respectively. As seen in FIG. 7, rearward end wall 22 is provided with a door member 98 which is pivotally secured thereto and which is adapted to selectively close the opening 100 in rearward end wall 22. An end member 88' is pivotally secured to the upper end of forward end wall 20 and has wing members 94' and 96' pivotally secured to opposite sides thereof. End member 88' and wing members 94' and 96' are identical to end member 88 and wing members 94 and 96 and for that reason will not be described in detail. End member 88' is provided with a door opening 90' formed therein which is identical to door opening 90 formed in end member 88. A suitable door means may be provided in one or both of the door openings 90 and 90' as desired, however, the drawings do not illustrate such optional doors.

The numeral 102 generally designates a main ridge member which is detachably secured to the upper ends of end members 88 and 88' and extends therebetween as seen in FIG. 7. A side support 104 is detachably secured at one end to ridge member 102 at the center thereof and is detachably secured at its other end to the upper end of top 70 of cover element 66. As seen in FIG. 10, side support 104 is provided with panels 106 and 108 formed in opposite sides thereof which are adapted to receive one end of roof panels 110 and 112 respectively. As seen in FIG. 9, ridge member 102 is provided with channels 114 and 116 formed therein which are adapted to receive the upper ends of the roof panels 110, 112, 118 and 120. A side support identical to side support 104 is not shown in the drawings but would be detachably secured to ridge member 102 and the upper end of top 70' of cover element 66' and would extend therebetween. Roof panels 118 and 120 would engage this side support in the same manner that roof panels 110 and 112 are received by side support 104. Each of the roof panels are provided with a channel portion 122 as seen in FIG. 10 which extends therefrom along two of its sides which is adapted to receive the upper ends of the end members, wing members and the upper end of the tops of the cover elements.

The unit is shown in a collapsed position in FIG. 1 and is assembled in the following manner. The brace supports at each corner of the base box are pivoted outwardly with respect thereto as seen in FIG. 2 and any necessary adjustment required is made by the adjusting bolt 54. Such adjustment is sometimes needed to compensate for a small amount of droop that is sometimes produced in the brace supports. The latch means 60 are unlatched to free the box members 58 and 58' from the base box 12 and the latch members 62 are also unlatched to permit the box members to be moved with respect to each other. The box members 58 and 58' are then slidably moved outwardly onto the brace supports as illustrated in FIG. 2. It can be seen that the box members 58 and 58' are not moved completely to the end of the brace supports and this is best illustrated in FIGS. 2 and 3. The cover elements 66 and 66' are then pivoted outwardly with repsect to box members 58 and 58' respectively so that sides 68 and 68' rest on the brace supports with tops 70 and 70' extending vertically upwardly therefrom. Flaps 78 and 78' are then pivoted outwardly with respect to the storage compartments 76 and 76' and latch means 82 and 82' are securely fastened. End member 88 is then pivotally moved upwardly from its position within base box 12 to the position of FIG. 3 and latch members 124 are fastened to effect the rigid connection between the end member 88 and the wall members 72 and 72'. Wing members 94 and 96 are then pivotally moved outwardly from their folded position to a position where they engage angles 80 and 80' and suitable latch means are then fastened to secure the connection between the wing members and the respective angles which are affixed to the tops 70 and 70'. The end member 88' would be assembled in a manner identical to that just described for end member 88 and for that reason will not be described in detail. The ridge member 102 is then secured to the upper ends of end members 88 and 88' and the side supports would then be extended from ridge member 102 to the upper ends of tops 70 and 70'. Ridge member 102 and the side supports are stored within base box 12 when the unit is in a collapsed position as are the roof panels. The roof panels are then slidably inserted into the various respective channels in the ridge member 102 and the side supports. Like, the panels are slightly deflected to permit the upper ends of end members 88, 88' and wing members 94, 94', 96, 96' to be received in the respective channel portions 122. It can be seen in FIG. 11 that the upper rearward end of base box 12 is provided with a recessed portion 126 which is adapted to meet with a recessed portion 128 in the box member 58 to act as a guide during the slidable movement of box member 58 on base box 12.

The unit would be collapsed by reversing the assembly procedure. It can be seen that the unit expands from a very compact unit to a unit having a great amount of usable space. The unit is extremely stable and weather tight due to the unique construction thereof. The unit is assembled in a convenient manner in a minimum amount of time. The ability of the box members 58 and 58' to slidably move outwardly with respect to the base box 12 provides a unit which is compactly collapsed but expands to a very large dwelling unit.

The storage compartments 76 and 76' may be utilized for the storing of kitchen utensils, blankets, etc. Also, the storage compartments 76 and 76' could be utilized for supporting a lavatory or the like. Thus from the foregoing it can be seen that the device accomplishes at least all of its stated objectives.

Some changes may be made in the construction and arrangement of my collapsible dwelling unit without departing from the real spirit and purpose of my invention, and it is my intention to cover by my claims, any modified forms of structure or use of mechanical equivalents which may be reasonably included within their scope.

I claim:
1. In a collapsible dwelling device:
a box means having opposite ends and opposite sides,
braces extensions secured to said box means at the opposite sides thereof, and adapted to be positioned in a laterally extending position,
first and second box members on top of said box means and being slidably movable to a position on said brace extensions,
said box members having a cover means pivotally secured thereto, said cover means including a portion adapted to be pivoted so that said portion extends vertically upwardly from said brace extensions,
end members pivotally secured to the ends of said box means and adapted to pivot from a horizontal position in said box means to a vertical position on the ends of said box means,
and a roof means detachably supported by said end members.

2. The device of claim 1 wherein said cover means includes an L-shaped member covering the top and outer side thereof, said cover members adapted to be pivoted so that the outer side rests on said brace extensions and said top extends vertically upwardly therefrom.

3. The device of claim 1 wherein wing members are pivotally secured to the sides of said end members and are adapted to pivot outwardly to join at their outer ends the vertical portions of said cover means.

4. The device of claim 1 wherein said brace extensions are secured to the corners of said box means and are adapted to pivot from a folded position adjacent the sides of said box means to said laterally extended position.

5. The device of claim 1 wherein said box members are slidably movable from a co-extensive position on said box means to said position on said brace extensions.

6. The device of claim 1 wherein a ridge member is secured to and extends between the upper ends of said end members, said roof panels being rigid and being detachably secured to said ridge member.

7. The device of claim 1 wherein a storage box means is mounted in at least one of said box members at one end thereof.

8. The device of claim 1 wherein said brace extensions have an adjustment means secured thereto adapted to selectively raise and lower the outer ends thereof with respect to said box means.

9. The device of claim 1 wherein said box members partially rest on said box means and partially rest on said brace extensions when moved to said position on said brace extensions.

10. The device of claim 1 wherein said wing members are adapted to be pivoted from a position closely adjacent said end members to said outwardly extending position.

11. The device of claim 1 wherein said box means is wheel supported and has a hitch means secured thereto and extending therefrom.

12. The device of claim 3 wherein said box means, box members, end members, wing members, and roof panels are constructed of a rigid material.

References Cited

UNITED STATES PATENTS 3,170,724  2/1965  Heil _____ 296—23
3,359,693  12/1967  Mitas _____ 296—23 X

FOREIGN PATENTS 998,255  9/1951  France.

PHILIP GOODMAN, *Primary Examiner.*

U.S. Cl. X.R.

52—64